United States Patent Office 3,766,221
Patented Oct. 16, 1973

3,766,221
PROCESS FOR THE MANUFACTURE OF
GLYCIDYL ETHERS
Wilhelm Becker, Hamburg, Germany, assignor to Reichhold-Albert-Chemie Aktiengesellschaft, Hamburg, Germany
No Drawing. Filed Feb. 22, 1971, Ser. No. 117,715
Claims priority, application Switzerland, Mar. 16, 1970, 3,866/70
Int. Cl. C07d 1/18
U.S. Cl. 260—348.6
14 Claims

ABSTRACT OF THE DISCLOSURE

The present invention relates to a process for the manufacture of glycidyl ethers of monohydric or polyhydric phenols by reaction of a monohydric or polyhydric phenol with excess epichlorohydrin in an alkaline medium, in which a monohydric or polyhydric phenol is reacted with excess epichlorohydrin, relative to the phenolic hydroxyl group, in the presence of about one equivalent of alkali hydroxide per equivalent of phenolic hydroxyl group, characterized in that 3 to 15 mols epichlorohydrin per mol phenolic hydroxyl group are reacted.

BACKGROUND OF THE INVENTION

(1) Field of the invention

The present invention relates to a process for the manufacture of glycidyl ethers of monohydric or polyhydric phenols by reaction of a monohydric or polyhydric phenol with excess epichlorohydrin in an alkaline medium, in which a monohydric or polyhydric phenol is reacted with excess epichlorohydrin, relative to the phenolic hydroxyl group, in the presence of about one equivalent of alkali hydroxide per equivalent of phenolic hydroxyl group, characterised in that 3 to 15 mols epichlorohydrin per mol phenolic hydroxyl group are reacted and that (a) the reaction with the alkali hydroxide to be added over a period of 30 to 300 minutes is lead thru in the presence of a member selected from the group consisting of choline and choline salts, single or in mixture, as catalyst being highly specific for the chlorohydrin ether formation from phenols and epichlorohydrin and in the presence of 2 to 8% by weight of water at 50 to 110° C., by removing the heat of reaction, and additionally in the presence of the water being formed during the reaction, and subsequently after formaiton of the glycidyl ether (b) the excess epichlorohydrin is removed by distillation together with the water from the reaction mixture and the glycidyl ether formed is isolated .

A further task of the invention is to provide a process for the manufacture of particularly valuable glycidyl ethers of monohydric or polyhydric phenols, that is to say glycidyl ethers which are of low viscosity, display a low epoxide equivalent and a very low chloride content of chlorine content, and possess great viscosity stability (measured according to DIN 16945.4.2), and which at the same time give good yields and conversions per unit time.

It is one task of the invention to be able to obtain glycidyl ethers of monohydric or polyhydric phenols in a very pure form, with the shortest possible kettle residence times, by reaction of the phenolic OH group with excess epichlorohydrin in the presence of catalysts and alkali.

The reaction can also be carried out in the presence of 3 to 25% by weight of an aliphatic alcohol of limited water solubility having 4 to 6 carbon atoms in the molecule, in regard to the employed amount of epichlorohydrin, whereby the course of reaction is not being disturbed. The addition of the above mentioned alcohols can be done before, during or after the reaction and facilitates the distillative removal of water after finishing the glycidyl ether formation.

For the same purpose the reaction can be done in sole or additional presence (to the aliphatic alcohol of limited solubility) of 3 to 25% by weight of aromatic solvents or by adding these aromatic solvents having a boiling point not higher than 160° C. before, during or after the reaction respectively, since they also serve as entrainer for the removal of water in step (b).

(2) Description of the prior art

It is known that glycidyl ethers of monohydric or polyhydric phenols are manufactured by reacting the compounds containing phenolic OH groups with epichlorohydrin in the presence of alkali. In doing so, it is possible to use 1 to 2 mols epichlorohydrin per mol phenolic OH group to manufacture solid glycidyl ethers, and to use 3 to 20 mols of epichlorohyrin per mol phenolic OH group to manufacture low molecular, liquid glycidyl ethers.

The alkali chloride formed during the reaction can be removed as a by-product according to various methods. According to the process described in German published specification 1,081,666, the manufacture of the liquid glycidyl ethers is carried out with exclusion of water. Such a process suffers from the disadvantage that it is necessary first to manufacture the alkali salt of the monohydric or polyhydric phenols in a dry form. Furthermore, the recovery of the unreacted phenolate from the alkali chloride produced during the reaction with epichlorohydrin is involved.

In the known processes (compare German patent specification 1,016,273) which are carried out in the presence of water, water and epichlorohydrin are distilled off from a solution containing 1 mol of a monohydric or polyhydric phenol in 3 to 12 mols epichlorohydrin per mol phenolic OH group as well as a solution of at least 15% by weight alkali in water. Herewith the products of distillation are separated and the epichlorohydrin is returned to the reaction mixture and also the speed of addition of the alkali hydroxide solution is regulated so that the composition contains 0.3 to 2% by weight water. The alkali chloride produced during the reaction is removed by filtration after removing the excess epichlorohydrin and taking up the residue in a suitable solvent. These processes suffer from the disadvantage that, as a result of the contact of the hot epichlorohydrin with the alkali at the relatively high temperature, undesired side reactions occur which lead to losses of epichlorohydrin, to glycidyl ethers of relatively high viscosities, and to gelled resin constituents. A further loss of epichlorohydrin results from the water which is separated off azeotropically containing 5 to 10 percent by weight of epichlorohydrin, the recovery of which from the water would be expensive.

According to another known process, which is described in German published specification 1,131,413, and which is mainly intended to be carried out continuously, the process is carried out in the presence of ketones with up to 4 C atoms. This process however suffers from the disadvantage that a great deal of ketone is lost with the aqueous phase which is separated off and its recovery makes the process more expensive. Furthermore, resins of relatively high viscosity are obtained.

According to the process described in Germany displayed specification 1,128,667, the alkali is dissolved in a lower alcohol and is then slowly added to a solution of the polyphenol in an epichlorohydrin. After completion of the reaction, excess epihalogenohydrin and the alcohol are distilled off together. With this process, a cyclic process on a technical scale is however hardly possible, since the water of reaction accumulates in the distillate, and only low molecular, water-soluble alcohols are suitable for preparing the alcoholic solution of alkali.

U.S. patent specification 2,848,435 has proposed the manufacture of glycidyl ethers in the presence of a secondary monohydric, alcohol especially sec.-butanol, in which case the advantage relative to the use of primary alcohols, such as ethyl alcohol or propyl alcohol, is supposed to be that lower losses of epichlorohydrin through formation of glycidyl ethers from the corresponding alcohols are supposed to arise. Only relatively high viscosity glycidyl ethers, in unsatisfactory yield, are obtained according to this process.

According to the process which is described in U.S. patent specification 3,336,342, polyhydric phenols are reacted with epihalogenohydrins in the presence of sulphonium salts or sulphur-containing compounds which can react with epihalogenohydrin to give sulphonium salts, to give the corresponding halogenohydrins, from which, after removing the excess epihalogenohydrin, hydrogen halide is split off in order to obtain the desired epoxide compounds. This process is very time consuming, since at least 40 hours are required to form the chlorohydrin ether. Furthermore, the excess epihalogenohydrin distilled off partially contains dihalogenohydrin and must be separately worked up before it is re-used. For these reasons, the process is very time-consuming, involved and uneconomical.

According to the process which is described in U.S. patent specification 3,372,142, not only carboxylic acids but also phenols are converted with excess epichlorohydrin, in the presence of benzyltrimethylammonium chloride or anionic exchange resins, into the chlorohydrin compounds, and thereafter converted into the epoxide compounds by means of an aqueous solution of an alkali metal hydroxide which is saturated with an alkali metal carbonate. Again it can be established that the process is much too time-consuming for practical purposes, since 25 hours are required for the formation of the chlorohydrin ether. Adding to this the working up of the chlorohydrin ether to give the epoxide compound, which would require a further 10–15 hours, leads to a kettle residence time which is unacceptable in practice.

A similar process is described in U.S. patent specification 2,943,096, according to which, again, polyhydric phenols and epichlorohydrin are converted into the chlorohydrin ether in the presence of tetramethylammonium chloride or benzyltrimethylammonium chloride. This again requires 26 hours. The further working up of the reaction mix proves to be very involved, since the excess epichlorohydrin, after being separated off by distillation, has to be worked up with sodium hydroxide solution, because of its content of dichlorohydrin to give a purer epichlorohydrin for re-use. The isolated chlorohydrin ether is dissolved in a solvent mixture of toluene/ethanol and converted into the glycidyl ether by reaction with 18% strength by weight aqueous sodium hydroxide solution. Here again the individual process stages demand long periods of time, so that the process cannot be considered very economcial.

SUMMARY OF THE INVENTION

The formation of the chlorohydrin ether, which takes place in the first reaction stage, under the influence of the specific catalyst, in accordance with the following equation:

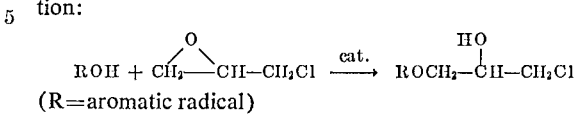

(R=aromatic radical)

is facilitated and accelerated by adding 2 to 8.0 percent by weight of water.

Furthermore, water of reaction is produced during the instantly commencing reaction of the alkali hydroxide with the chlorohydrin ether in form the epoxide group.

The addition of the alkali hydroxide in the presence of a catalyst which is specific to the formation of the chlorohydrin ether results in important advantages: rapid, complete formation of the chlorohydrin ether is ensured. Sparingly soluble phenoxy-ethers cannot form from the glycidyl ethers already produced through starting to add the alkali hydroxide, since the reaction mixture very rapidly becomes depleted in free phenols whilst such phenoxy-ethers can easily be formed if the reaction velocity of the formation of the chlorohydrin ether is too low and glycidyl ethers and phenols are hence simultaneously present in the alkaline medium:

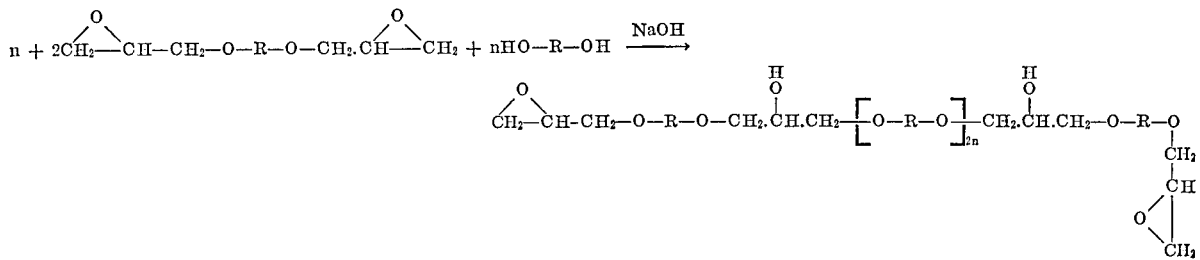

(R=aromatic radical).

This would considerably reduce the yield and make the isolation of the glycidyl ether more difficult. Furthermore, since in the case of the addition of alkali hydroxide only the monomeric chlorohydrin ether is present from the start, the formation of a largely monomeric glycidyl ether is also ensured.

An essential advantage of the new method manifests itself in using an equal phenol/epichlorohydrin ratio to manufacture glycidyl ethers of lower molecular weight characterised in that they show viscosities being about 20% lower than those obtained by known earlier process. This represents a substantial technical advance in as much as a higher yield is achieved also for the same amount of material introduced.

It is furthermore possible, using the process of this invention, always to re-use the distillate for new compositions, obtained after the condensation, of epichlorohydrin, the alcohols of limited solubility in water and/ or eventually the aromatic solvents, after making up for the proportions of epichlorohydrin consumed and the losses on distillation, without rectification and without the condensation products being disadvantageously affected. This actually for the first time permits streamlined chargewise manufacture of the glycidyl ether.

The process of this invention is further distinguished in that the yield almost corresponds to the amount of glycidyl ether produced theoretically in regard to the used amount of phenol. Additionally, the secondary losses of epichlorohydrin through undesired side-reactions, such as for example the polymerisation of the epichlorohydrin or ether formations from epichlorohydrin and the alcohol of limited solubility in water, in the presence of alkali, are also repressed to a minimum through the lower reaction temperature of 50 to 110° C., preferably 75 to 95° C., which is employed.

A further considerable technical advance resides in the fact that when using choline or choline salts considerably lighter, almost water-clear glycidyl ethers can surprisingly be manufactured, these otherwise only being obtainable through a molecular distillation.

With glycidyl ethers of bisphenol A, which show such considerably lower color indices, it is possible, when using correspondingly light epoxide resin curing agents, to open up new fields of use which were previously reserved to unsaturated polyesters, but for which the latter were only of limited suitability because of their less favorable chemical resistance and mechanical properties. Such end uses are, for example, potting of electrical, anatomical and other objects, white-pigmented coatings and lacquer paints.

As monohydric or polyhydric phenols it is possible to use: phenol, o-, m- and p-cresol, 1,2,4-, 1,2,6-, 1,2,3-, 1,2,5-, 1,3,4- and 1,3,5-xylenol, p-tertiary butylphenol, o-, m- and p-phenylphenol, the isomeric amylphenols, octylphenols and nonylphenols, pyrocatechol, resorcinol, hydroquinone, 1,4-dihydroxynaphthalene and other dihydroxynaphthalenes, 4,4' - dihydroxydiphenyl, 2,2' - dihydroxydiphenyl and other isomeric dihydroxydiphenyls, 2,2'-, 2,4'- and 4,4'-dihydroxydiphenylmethane individually or as a mixture (also described as bisphenol F), 4,4'-dihydroxydibenzyl, and also substituted dihydroxydiphenylmethanes, such as are obtained by acid condensation of phenols with aldehydes or ketones, especially 4,4'-dihydroxydiphenyl - 2,2 - propane, so-called diphenylolpropane or bisphenol A, which can be manufactured from phenol and acetone, and also dihydroxydiphenylcyclohexane. As further examples there may be quoted:

4,4'-dihydroxy-3,3',5,5'-tetramethyldiphenyl-methane,
4,4'-dihydroxy-3,3',5,5'-tetramethyldiphenyl-2,2-propane,
4,4'-dihydroxy-3,3',5,5'-tetra-p-tert.-butyl-diphenyl-methane,
4,4'-dihydroxy-3,3',5,5'-tetra-p-tert.-butyl-diphenyl-2,2-propane,
4,4'-dihydroxy-3,3'-dimethyl-5,5'-di-p-tert.-butyl-diphenylmethane,
4,4'-dihydroxy-3,3'-dimethyl-5,5'-di-p-tert.-butyl-diphenyl-2,2-propane,
4,4'-dihydroxy-3,3',5,5'-tetraamyl-diphenyl-cyclohexane,
4,4'-dihydroxy-3,3',5,5'-tetra-p-tert.-butyl-diphenyl-cyclohexane and
4,4'-dihydroxy-3,3'-dimethyl-5,5'-di-p-tert.-butyl-diphenyl-cyclohexane.

The polyhydric phenols used as starting substances can, apart from containing the phenolic hydroxyl groups, also contain yet further substituents or functional groups in the molecule, for example hydrocarbon radicals, ether groups, ester groups, halogen atoms, hydroxyl groups and others, provided these do not interfere with the reaction. Accordingly it is possible to use for instance: 4,4'-dihydroxydiphenylsulphone, tetrabromo-bisphenol, tetrachlorobisphenol, chlorohydroquinones, methylresorcinol and phloroglucinol.

It is also possible to use polyhydric phenols, for example novolac resins, which are obtained by acid-catalysed condensation of phenol, p-cresol or other substituted phenols with aldehydes, such as formaldehyde, acetaldehyde, crotonaldehyde, i-butyraldehyde, i-nonylaldehyde and the like, condensates of phenols with cardanol, such as are described in U.S. patent specification 2,317,607, condensates of phenols with aliphatic diols, such as are described in U.S. patent specification 2,321,620, and condensates of phenols with unsaturated fatty oils, such as are described in U.S. patent specification 2,031,586.

The above list for the compounds which are suitable for use as starting substances is not exhaustive. An extensive compilation of the possible compounds is for example contained in the book "Epoxydverbindungen und Epoxydharze" ("Epoxide Compounds and Epoxide Resins") by A.M. Paquin, Springer Verlag, 1958, pages 256–307.

Preferentially, phenol, p-tertiary butylphenol, bisphenol A, bisphenol F and tetrabromobisphenol are employed.

In a special embodiment, a mixture of 0.60 to 0.99 mol of bisphenol A and 0.40 to 0.01 mol of a diphenol from the group of the above-mentioned compounds, especially hydroquinone, resorcinol and bisphenol F is used for the production of diglycidylethers of low viscosity (6,000 to 16,000 cp./25° C.) in order to prevent crystallisation of these products during prolonged storage in cool rooms.

As alkali hydroxides sodium or potassium hydroxide can be used in granular, flake or powdered form, sodium hydroxide being the preferred alkali hydroxide.

3 to 15, preferably 3 to 7 mols of epichlorohydrin are used in the reaction per mol phenolic OH group. As specific catalysts for the formation of chlorhydrin ether from phenolic hydroxyl and epichlorohydrin it is possible to employ: choline, -chloride, -bromide, -iodide, -nitrate, -sulfate, -phosphate, -citrate, -hydrogen citrate, -hydrogen tartrate, -acetate, -propionate, -laurate, -octoate, -glycolate, -ricinolate or other inorganic and/or organic choline salts in the solid or dissolved form containing such acids that do not disturb the course of reaction. Preferably choline or choline chloride is employed. The catalyst is used in amounts of 0.05 to 5 mole percent, preferably 0.1 to 1 mol percent, relative to the amount of phenolic component.

Alcohols of limited solubility in water that can be used are for instance, n-butanol, i-butanol, sec-butyl-alcohol, the various isomeric pentanols or hexanols, preferably i-butanol or n-butanol, and in particular preferably using an amount of 5 to 10 percent by weight, relative to the amount of epichlorohydrin employed.

The aromatic solvents used for the same purpose, in the sole presence, or presence additional to the aliphatic alcohols of limited solubility in water, are benzene, toluene, xylene, preferably xylene.

In all cases, the presence of 2 to 8 percent by weight of water during the beginning and step (a) of the reaction is important. The reaction is carried out in the presence of 0.95 to 1.15 equivalents of a solid alkali hydroxide per equivalent of phenolic hydroxyl group, the hydroxide being added in portions or continuously at 50 to 110° C., preferably 75 to 95° C., over the course of 30 to 300 minutes, under normal pressure or reduced pressure, whilst removing the heat of reaction by cooling and/or by distillation under reflux.

In step (b) the excess epichlorohydrin is being removed from the reaction mixture together with the water and eventually with the added solvents by distillation. Then the formed glycidylether is isolated by filtration or dissolving in the same amount by weight of a proper solvent as, for example, benzene, toluene, xylene or methylisobutylketone, and by removal of the formed alkali chloride with the aid of water and subsequent removal of the solvent by distillation.

In a special embodiment, the last remnants of organic solvents are removed from the liquid glycidyl ether by steam distillation at temperatures of 100 to 180° C., preferably 140 to 160° C., if appropriate by means of a vacuum.

In the best embodiment, as being realized in Example 4, 8 to 12 mols epichlorohydrin are brought to reaction with 1 mol bisphenol A in the presence of 0.75 mol percent choline chloride, relative to the amount of the used bisphenol A, as well as 5% by weight of xylene and 2% by weight of water, both relative to the reaction mixture, and the mixture is treated in portions with 2.05 mols caustic soda during 120 minutes at a temperature of 95° C.

The water of reaction is being removed from the mixture after the reaction is finished, that means in step (b), at 95° C. by a cyclic distillation process after which the excess epichlorohydrin is being removed under reduced pressure (10–50 mm. Hg). The last amounts of epichlorohydrin are removed under these conditions at 120° C. in about an hour. The residue is dissolved in about the same amount by weight of xylene and the formed sodium chloride is dissolved out with the aid of the amount of water needed for the formation of an about 15% by weight sodium chloride solution.

After neutralizing the organic phase using a 10% by weight sodium dihydrogen phosphate solution the organic phase is being liberated from residual water by a cyclic distillation process under normal pressure and then filtrated. Xylene is removed up to a temperature of 150° C. and a vacuum of 10 to 50 mm. Hg. By a distillation with steam or by adding dropwise 3% by weight of deionized water the last traces of xylene are removed under the same conditions.

In another embodiment, the volatile constitutents are removed from the liquid glycidyl ether heated to 100 to 180° C., preferably 140 to 160° C., by allowing 1 to 10% by weight, preferably 6 to 3% by weight, relative to the glycidyl ether, of aqueous hydrogen peroxide solution ($H_2O_2$—content 1 to 20% by weight, preferably 3 to 6% by weight) to run in whilst stirring.

The following examples explain the process in more detail:

EXAMPLE 1

495 g. of bisphenol A (molar ratio 1:8)
1610 g. of epichlorohydrin
140 g. of i-butanol
95 g. of xylene
72 g. of water and
2.25 ml. of a 70% strength solution of choline chloride in water are together heated to 95° C. 178 g. of sodium hydroxide (NaOH content at least 98% by weight) are added at 95° C. over the course of 180 minutes in uniform portions, any requisite removal of heat being effected by cooling or distillation under a reflux condenser.

After completion of the addition, a circulatory dehydration, is carried out at 95° C. for approx. 30 minutes under normal pressure or slightly reduced pressure. Thereafter the excess epichlorohydrin is removed from the mix by a vacuum distillation, heating the mix up to 120° C. The mix is kept for a further hour at 120° C. under a full vacuum. It is then diluted with 750 g. of xylene and after 10 minutes is stirred up with 990 g. of water. After stirring for 20 minutes, the mixture is allowed to settle for about 30 minutes, and the aqueous phase is separated off. The organic phase is adjusted to a pH value of 6.5 to 7.2 by means of a 10 percent strength by weight sodium dihydrogen phosphate solution in water. A cyclic dehydration by distillation is carried out, and after azeotropic removal of the water, 75 g. of xylene are further separated off. After adding 5 g. of a filter aid based on kieselguhr, the mixture is filtered and transferred into a clean flask. The solvent is distilled off, up to a temperature of 150° C. The residue is then kept at 150° C. for further 30 minutes under full vacuum (10–50 mm. Hg.). 12 g. of deionised water are added dropwise to the mix under the same conditions over the course of 30 minutes, whereby the last traces of xylene are removed. Thereafter the mix is kept at 150° C. under a full vacuum for a further 30 minutes. After cooling to <100° C., the mixture is again filtered if appropriate. 700 g. of the polyglycidyl ether of bisphenol A having an epoxide equivalent of 182, a viscosity of 12,690 cp. measured at 25° C., a total chlorine content of 0.27% by weight and a pot life of 39 minutes are obtained. By pot life, ther is understood the time which elapses until a mixture of 100 g. of the polyglycidyl ether and 13 g. of triethylenetetramine gels at 20° C. room temperature.

The Gardner Color Index was less than 1 and the Hazen Color Index (hereafter abbreviated HCl) was 50. (By the Hazen Color Index there is understood the number of mg. of Pt per litre of a solution of $K_2PtCl_6$ and $$CoCl_2 \cdot 6H_2O$$

(1:0.825) in 3.6% strength by weight HCl, which at the same layer thickness shows the same color shade as the comparison sample (ASTM D 1209/62, Pt/Co-Standard: Hazen-standard (APHA)).

EXAMPLE 2

The process was carried out in accordance with the instructions in Example 1, using the following amounts:

397 g. of bisphenol A (molar ratio 1:10)
1610 g. of epichlorohydrin
140 g. of i-butanol
95 g. of xylene
58 g. of water and
2 ml. of a 70% strength by weight aqueous choline chloride solution are together heated to 95° C. 145 g. of sodium hydroxide (NaOH content at least 98% by weight) are added uniformly over the course of 135 minutes.

After working up in accordance with the instructions in Example 1, 550 g. of the polyglycidyl ether of bisphenol A, having an epoxide equivalent of 181, a viscosity of 8930 cp., measured at 25° C. in the Höppler viscometer, a total chlorine content of 0.29% by weight, a pot life of 45 minutes and an HCl of 60, were obtained.

EXAMPLE 3

The process was carried out in accordance with the instructions in Example 1, using the following amounts:

330 g. of bisphenol A (molar ratio 1:12)
1610 g. of epichlorohydrin
140 g. of i-butanol
95 g. of xylene
48 g. of water and
1.5 ml. of a 70% strength by weight aqueous chloline chloride solution are together heated to 95° C. 120 g. of sodium hydroxide (NaOH content at least 98% by weight) are added uniformly over the course of 120 minutes at this temperature.

After working up in accordance with the instructions in Example 1, 475 g. of the polyglycidyl ether of bisphenol A, having an epoxide equivalent of 178, a viscosity of 6980 cp. at 25° C., a total chlorine content of 0.30% by weight, a pot life of 47 minutes and an HCl of 5 were obtained.

COMPARISON 1

The process was carried out in accordance with the instructions in Example 1, using the following amounts:

330 g. of bisphenol A,
1610 g. of epichlorohydrin
140 g. of i-butanol
95 g. of xylene and
48 g. of water were together heated to 95° C. 120 g. of sodium hydroxide (NaOH content at least 98% by weight) are added uniformly over the course of 120 minutes at this temperature.

After working up in accordance with the instructions in Example 1, 380 g. of polyglycidyl ether of bisphenol A, having an epoxide equivalent of 204, a viscosity/25° C. of 15,780 cp, a total chlorine content of 0.38% by weight, a pot life of 29 minutes, and HCl>150 and a Gardner Color Index of 2, were obtained.

COMPARISON 2

(a) A reaction vessel provided with a heating device, stirring device, thermometer and distillation head with a separator which permits the lower layer to flow back into the reaction vessel, was charged with a solution which contained epichlorohydrin and bisphenol A in a molar ratio of 10:1. The solution was heated to about 100 to 110° C. and kept at this temperature, whilst 1.9 mols of sodium hydroxide per mol of bisphenol A were added in the form of a 40% strength by weight aqueous solution. The water which was distilled from the reaction mixture, and the epichlorohydrin, were condensed at the head, and only the separated epichlorohydrin layer was passed back into the reaction mixture. The temperature was kept at about 100° C. by regulating the speed of addition of the caustic alkali solution and the speed of distillation, so that the reaction mixture contained about 1.5% by weight of water, the addition being effected approximately over the course of 2 hours. After completion of addition of the potassium hydroxide the bulk of the unreacted epichlorohydrin was distilled from the reaction mixture, after which a vacuum down to a pressure of 1 mm. Hg was applied at 160° C. in order to remove the residual epichlorohydrin. The residue consisting of the ether product and salt was cooled and an equal amount by weight of methyl isobutylketone, relative to the ether, was added to this residue, together with a three-fold amount by weight of water. The mixture was stirred until the temperature reached about 25° C., after which it was left to stand so as to separate into layers. The salt liquor, containing about 9.5% by weight of salt, was separated off and discarded. The organic phase with the ether product, containing about 1% by weight of organically bonded chlorine, was then brought into contact with an equal amount by weight of a 5% by weight strength aqueous sodium hydroxide solution and the mixture was then stirred for 1 hour at about 80° C. The amount of the excess sodium hydroxide was about 8 to 9 times the amount required for reaction with the organically bonded chlorine in the ether product. The mixture was then cooled to 50° C. and the aqueous phase was separated off. The organic phase was then stirred with about half its amount by weight of a 2% by weight strength aqueous solution of monosodium phosphate at about 25° C., so as to neutralise any residual sodium hydroxide which might still be present. After separating the phases, the methyl isobutyl ketone was distilled from the organic phase, initially at up to 160° C. under atmospheric pressure, and then reducing the pressure down to about 1 mm. Hg at the same temperature. The resulting diglycidyl ether of bisphenol A was a light yellow liquid having an epoxide equivalent of 180, a viscosity of 12,000 cp./25° C., a pot life of 38 minutes, an HCl>150 and a Gardner Color Index of 2–3.

EXAMPLE 4

The process was carried out in accordance with the instructions in Example 1, using the following amounts:

330 g. of bisphenol A
1610 g. of epichlorohydrin
95 g. of xylene
48 g. of water and
1.5 ml. of a 70% strength by weight aqueous choline chloride solution are together heated to 95° C. 120 g. of sodium hydroxide (NaOH content at least 98% by weight) are added uniformly over the course of 120 minutes at this temperature.

After working up in accordance with the instructions in Example 1, 461 g. of polyglycidyl ether of bisphenol A, having an epoxide equivalent of 178, a viscosity/25° C. of 7960 cp., a total chlorine content of 0.29% by weight, a pot life of 42 minutes and an HCl of 45, were obtained.

EXAMPLE 5

The process was carried out in accordance with the instructions in Example 1, using the following amounts:

330 g. of bisphenol A
1610 g. of epichlorohydrin
140 g. of n-butanol
48 g. of water and
1.5 ml. of a 70% strength by weight aqueous chloine chloride solution are together heated to 95° C. 120 g. of sodium hdyroxide (NaOH content at least 98% by weight) are uniformly added at this temperature over the course of 120 minutes.

After working up in accordance with the instructions in Example 1, 470 g. of a polyglycidyl ether of bisphenol A, having an epoxide equivalent of 180, a viscosity/25° C. of 7960 cp., a total chlorine content of 0.30% by weight, a pot life of 44 minutes and an HCl of 50 were obtained.

EXAMPLE 6

The process was carried out in accordance with the instructions in Example 1, using the following amounts:

330 g. of bisphenol A
1610 g. of epichlorohydrin
48 g. of water and
1.5 ml. of a 70% strength by weight aqueous chloine chloride solution are together heated to 95° C. 120 g. of sodium hydroxide (NaOH content at least 98% by weight) are added uniformly at this temperature over the course of 120 minutes.

After working up in accordance with the instructions in Example 1, 470 g. of polyglycidyl ether of bisphenol A, having an epoxide equivalent of 179, a viscosity/25° C. of 8248 cp., a total chlorine content of approx. 0.27% by weight, a pot life of 45 minutes and an HCl of 60 were obtained.

EXAMPLE 7

The process was carried out in accordance with the instructions in Example 1, using the following amounts:

290 g. of bisphenol F (mixture of the 2,2'-, 2,4'- and 4,4'-isomers)
1610 g. of epichlorohydrin
48 g. of water
140 g. of n-butanol
95 g. xylene and
1 g. of choline chloride are together heated to 95° C. 121 g. of sodium hydroxide (NaOH content at least 98% by weight) are added uniformly at this temperature over the course of 120 minutes.

After working up in accordance with the instructions in Example 1, 390 g. of a polyglycidyl ether of bisphenol F, having an epoxide equivalent of 170, a viscosity/25° C. of 2520 cp., a total chlorine content of 0.34% by weight, a pot life of 29 minutes and a Gardner Color Index of 3 were obtained.

COMPARISON 3

The same mix, used without choline chloride, gave 370 g. of the polyglycidyl ether of bisphenol F, having an epoxide equivalent of 177, a viscosity/25° C. of 3100 cp., a total chlorine content of 0.39% by weight, a pot life of 35 minutes an a Gardner Color Index of 5–6.

COMPARISON 4

The process was carried out in accordance with the instructions in Example 1, using the following amounts:

330 g. of bisphenol A
1610 g. of epichlorohydrin
48 g. of water
140 g. of i-butanol
95 g. of xylene and
0.5 ml. or diethyl sulphide are together heated to 95° C. 121 g. of sodium hydroxide (NaOH content at least 98% by weight) are added uniformly at this temperature over the course of 120 minutes.

After working up in accordance with the instructions in Example 1, 470 g. of a polyglycidyl ether of bisphenol A, having an epoxide equivalent of 182, a viscosity/25° C. of 10.000 cp., a total chlorine content of 0.30% by weight, a pot life of 42 minutes and a Gardner Color Index of 3–4 were obtained.

COMPARISON 5

The process was carried out in accordance with the instructions in Example 1, but reacting the following amounts:

330 g. of bisphenol A
1610 g. of epichlorohydrin
140 g. of i-butanol
48 g. of water
95 g. of xylene and
1 ml. of a 75% strength by weight solution of octyldimethylbenzyl chloride in isopropanol are together heated to 95° C. 121 g. of sodium hydroxide (NaOH content at least 98% by weight) are uniformly added at this temperature over the course of 120 minutes.

After working up in accordance with the instructions in Example 1, 471 g. of a polyglycidyl ether of bisphenol A, having an epoxide equivalent of 182, a viscosity/25° C. of 10,070 cp., a total chlorine content of 0.35% by weight a pot life of 46 minutes, an HCl>150 and a Gardner Color Index of 2-3 were obtained.

COMPARISON 6

The process was carried out in accordance with the instructions in Example 1, using the following amounts:

330 g. of bisphenol A
1610 g. epichlorohydrin
140 g. of i-butanol
95 g. of xylene
48 g. of water and
1 g. of triphenylphosphine are together heated to 95° C. 121 g. of sodium hydroxide (NaOH content at least 98% by weight) are uniformly added at this temperature over the course of 120 minutes.

After working up in accordance with the instructions in Example 1, 457 g. of a polyglycidyl ether of bisphenol A, having an epoxide equivalent of 205, a viscosity, measured at 25° C. in the Höppler viscometer, of 18,970 cp., a total chlorine content of 0.37% by weight, a pot life of only 27 minutes, an HCl >150 and a Gardner Color Index of 3-4 were obtained.

EXAMPLE 8

The process was carried out in accordance with the instructions in Example 1, using the following amounts:

420 g. of p-tert.-butylphenol
1820 g. of epichlorohydrin
150 g. of i-butanol
100 g. of xylene
49 g. of water and
2 g. of pulverulent mixture of 50% by weight of choline chloride and silica gel are together heated to 95° C. 114 g. of sodium hydroxide (NaOH content at least 98% by weight) are uniformly added at this temperature over the course of 120 minutes.

The working up of the mix took place after removing the excess epichlorohydrin, by dissolving in 350 g. of xylene and twice eluting the xylene solution with 3120 g. of water. Thereafter the xylene was removed by distillation in vacuo up to a temperature of 150° C. and by keeping the material under a full vacuum (10-50 mm. Hg) at 150° C. for one hour. After filtration, 530 g. of water-white p-tert.-butylphenol-glycidyl-ether, having an epoxide equivalent of 216, were obtained.

EXAMPLE 9

The process was carried out in accordance with the instructions in Example 1, but reacting the following amounts:

247.5 g. of bisphenol A
68 g. of bisphenol F (obtained mixture of the 2,2'-, 2,4'- and 4,4'-isomers),
1610 g. of epichlorohydrin
140 g. of i-butanol
95 g. of xylene
48 g. of water and
1.7 ml. of a 70% strength by weight aqueous choline chloride solution were together heated to 95° C. 125 g. of sodium hydroxide (NaOH content at least 98% by weight) are uniformly added at this temperature over the course of 120 minutes.

After working up in accordance with the instructions in Example 1, 440 g. of a polyglycidyl ether of the bisphenol A/bisphenol F mixture, having an epoxide equivalent of 175, a viscosity/25° C. of 6100 cp., a total chlorine content of 0.37% by weight and a pot life of 30 minutes were obtained.

EXAMPLE 10

The process was carried out in accordance with the instructions in Example 1, but reacting the following amounts:

145 g. of resorcinol
1610 g. of epichlorohydrin
140 g. of i-butanol
95 g. of xylene
48 g. of water and
1.7 ml. of a 70% strength by weight choline chloride solution were together heated to 95° C. 125 g. of sodium hydroxide (NaOH content at least 98% by weight) are uniformly added at this temperature over the course of 120 minutes.

After working up in accordance with the instructions in Example 1, 2340 g. of the glycidyl ether of resorcinol, having an epoxide equivalent of 123, a viscosity/25° C. of 487 cp. and a total chlorine content of 0.35% by weight, were obtained.

The table which follows makes the technical advance of the new process clear through comparing the color indices.

TABLE

| | Example | | | | | | | | Comparison | | | | |
|---|---|---|---|---|---|---|---|---|---|---|---|---|---|
| Base | 1 | 2 | 3 | 4 | 5 | 6 | 7 | 3 | 1 | 2 | 4 | 5 | 6 |
| | Bis. A | Bis. A | Bis. A | Bis. A | Bis. A | Bis. A | Bis. F | Bis. F | Bis. A | Bis. A | Bis. A | Bis. A | Bis. A |
| HCl | 50 | 60 | 45 | 45 | 50 | 60 | | | >150 | >150 | >150 | >150 | >150 |
| Gardner CI | <1 | <1 | <1 | <1 | <1 | <1 | 3 | 5-6 | 2 | 2-3 | 3-4 | 2-3 | 3-4 |

EXAMPLE 11

The process was carried out in accordance with the instructions in Example 1, using the amounts indicated for Example 4. However, before adding the 120 g. of sodium hydroxide (NaOH content at least 98% by weight), the reaction mixture was kept for 60 minutes at 95° C.

The properties of the polyglycidyl ether corresponded to those of Example 4.

I claim:

1. In a process for the manufacture of glycidyl ethers of monohydric or polyhydric phenols with excess epichlorohydrin in an alkaline medium wherein a monohydric or polyhydric phenol is reacted with excess epichlorohydrin, relative to the phenolic hydroxyl group, in the presence of about one equivalent of alkali hydroxide per equivalent of phenolic hydroxyl group, the improvement comprising:
   (a) heating to about 50–110° C. the reaction mixture containing 2 to 15 moles epichlorohydrin per mole phenolic hydroxyl groups, 0.05 to 5 moles percent, relative to the phenolic component, of choline, choline salts or mixtures thereof as a catalyst, 2 to 8 percent by weight of water relative to the mixture, and
   (b) adding solid alkali hydroxide over a period of 30 to 300 minutes to the mixture under total reflux at about 50–110° C., and, after formation of the glycidyl ether,
   (c) removing the water azeotropically with return of the epichlorohydrin to the reaction mixture at 95° C. and thereafter distilling the epichlorohydrin off under reduced pressure and isolating the glycidyl ether formed.

2. The process according to claim 1, wherein the reaction is carried out at 75 to 95° C.

3. The process according to claim 1, wherein the reaction in step (a) and (b) or (b) alone, is carried out in the presence of 3 to 25 percent by weight of an aliphatic alcohol of limited solubility in water, relative to the amount of epichlorohydrin employed.

4. The process according to claim 3, wherein the reaction is carried out in the presence, in addition to the aliphatic alcohol of limited solubility in water, of 3 to 25 percent by weight of the aromatic solvent, toluene.

5. The process according to claim 1, wherein the reaction in step (a) is carried out in the presence of 2.0 to 4.0 percent by weight of water, relative to the mixture to be employed.

6. The process according to claim 1, wherein bisphenol A is employed as the phenolic component.

7. The process according to claim 1, wherein a mixture of 0.6 to 0.99 moles of bisphenol A and 0.4 to 0.01 mole of a phenol selected from the group consisting of hydroquinone, resorcinol or bisphenol F is employed as the polyhydric phenol.

8. The process according to claim 1, wherein 3 to 7 moles epichlorohydrin per mole phenolic hydroxyl group are employed.

9. The process according to claim 1, wherein the catalyst for the formation of the chlorohydrin ether from phenolic hydroxyl and epichlorohydrin is employed in amounts of 0.05 to 5 percent by weight, relative to the phenolic component.

10. The process according to claim 3, wherein 5 to 10 percent by weight of n-butanol or isobutanol are employed as the aliphatic alcohol.

11. The process according to claim 4, wherein 5 to 10 percent by weight of xylene is employed as the aromatic solvent.

12. The process according to claim 1, wherein choline chloride is employed, as the catalyst.

13. The process according to claim 9, wherein 0.1 to 1 percent by weight of the catalyst is employed.

14. The process according to claim 1, wherein in step (a) the reaction mixture is kept at about 95° C. for 60 minutes prior to addition of the solid alkali hydroxide.

References Cited

UNITED STATES PATENTS 3,221,032  11/1965  Price et al. _____ 260—348.6

FOREIGN PATENTS 653,729    12/1962  Canada.
240,906    10/1962  Australia.
1,159,530  7/1969   Great Britain.

NORMA S. MILESTONE, Primary Examiner